United States Patent [19]

Peacock et al.

[11] Patent Number: 5,241,617
[45] Date of Patent: Aug. 31, 1993

[54] OPTICAL FIBRE BACK PLANE

[75] Inventors: John Peacock; Lee Peter, both of Ipswich, England

[73] Assignee: British Telecommunications public limited company, London, England

[21] Appl. No.: 761,780

[22] PCT Filed: Apr. 10, 1990

[86] PCT No.: PCT/GB90/00546
  § 371 Date: Sep. 24, 1991
  § 102(e) Date: Sep. 24, 1991

[87] PCT Pub. No.: WO90/12334
  PCT Pub. Date: Oct. 18, 1990

[30] Foreign Application Priority Data
  Apr. 13, 1989 [GB] United Kingdom ............. 8908399

[51] Int. Cl.⁵ .................................................. G02B 6/36
[52] U.S. Cl. ....................................................... 385/135
[58] Field of Search .......................................... 385/135

[56] References Cited

U.S. PATENT DOCUMENTS 4,840,449 6/1989 Ghandeharizadeh .......... 385/135
4,911,521 3/1990 Ryuto et al. .................. 385/135
4,932,744 6/1990 Messelhi ....................... 385/135

FOREIGN PATENT DOCUMENTS 0202994 11/1986 European Pat. Off. .
0220969 5/1987 European Pat. Off. .
0281196 9/1988 European Pat. Off. .
3116869 11/1982 Fed. Rep. of Germany .
2176907 1/1987 United Kingdom .

Primary Examiner—Frank Gonzalez
Attorney, Agent, or Firm—Nixon & Vanderhye

[57] ABSTRACT

An optical fibre back plane (4) feeds incoming optical fibres (11) to exchange equipment. The optical fibre back plane (4) comprises a support member (5) attachable to the exchange equipment for pivotal movement about an axis (9). An optical interface is provided for connecting the incoming optical fibres to on-board optical fibres. The optical fibre back plane (4) is provided with support means (12) for supporting the incoming optical fibres (11), the support means extending parallel, and closely adjacent, to the axis (9).

19 Claims, 3 Drawing Sheets

OPTICAL FIBRE BACK PLANE

This invention relates to an optical fibre back plane for telephone exchange equipment such as transmission, switching and/or distribution equipment.

Exchange equipment of this type has a plurality of vertically-spaced shelves, each of which contains a plurality of vertically-positioned cards carrying electronic components. A back plane is positioned behind the cards of each shelf, the back planes being provided with connectors for interfacing the cards with other cards and with external cabling. Typically, external cabling is housed within vertical channels positioned at the sides of the shelves.

Conventionally, external cabling is co-axial, and this is generally satisfactory for exchange transmission equipment, that is to any transmission equipment for multiplexing bit streams for transmission over trunk and junction networks. Nowadays, however, it is envisaged that such transmission equipment will incorporate switching equipment, and this leads to problems in making interconnections with the back planes. Basically, these problems arise from the size of the connectors which are required for co-axial cable. Moreover, the problem is exacerbated by the requirements for such equipment to cope with increased bit transmission rates.

One known way of alleviating these problems is to use optical fibre cables instead of co-axial cables. Apart from their increased bandwidth, the advantage of using optical fibres is that they are physically much smaller than co-axial cable, and so are easier to connect to the back planes of exchange equipment. Unfortunately, in conventional optical technology, incoming optical fibres are exposed, and so must be ruggedised. This leads to an increase in effective fibre size, and also to an approximately tenfold cost increase.

The aim of the invention is to provided an optical fibre back plane for feeding optical fibres to exchange equipment without requiring such optical fibres to be ruggedised.

The present invention provides an optical fibre back plane for feeding incoming optical fibres to exchange equipment, the optical fibre back plane comprising a support member, attachment means for attaching the support member to the exchange equipment for pivotal movement about an axis, and optical interface means for connecting the incoming optical fibres to on-board optical fibres, wherein the optical fibre back plane is provided with support means for supporting the incoming optical fibres, the support means extending parallel, and closely adjacent, to said axis.

Advantageously, the back plane is provided with second optical interface means for connecting on-board optical fibres to optical fibres leading to the exchange equipment.

In a preferred embodiment, the support member is formed with a first fibre storage area for storing spare incoming optical fibres, and the support member is formed with a second fibre storage area for storing spare on-board optical fibres. The fibre storage areas may be positioned on opposite sides of the support member. Conveniently, the or each fibre storage area is provided with at least one generally cylindrical boss whose radius of curvature is at least equal to the minimum bend radius for optical fibres.

Preferably, the support means is constituted by a tube extending part way along the support member adjacent to one edge thereof, said one edge being associated with a hinge which constitutes the attachment means. The incoming optical fibres exiting the tube may be guided towards the first fibre storage area by a curved channel whose radius of curvature is at least equal to the minimum bend radius for optical fibres. Advantageously, the first fibre storage area is positioned on the opposite side of the support member to the tube, the incoming optical fibres passing from the curved channel to the first fibre storage area via a slot formed in the support member.

The first-mentioned optical interface means may be positioned within the first fibre storage area. Conveniently, the on-board optical fibres pass from the first fibre storage area to the second fibre storage area via said slot and via a second curved channel formed adjacent to the second fibre storage area, the radius of curvature of the second curved channel being at least equal to the minimum bend radius for optical fibres.

Advantageously, the support member is provided with optical components such as couplers, switches, WDM devices or filters. These optical components may be positioned within a fibre storage area.

Each of the on-board optical fibres may be guided towards a respective optical connector by a respective guide means, the optical connectors constituting the second optical interface means. Preferably, each of said guide means is constituted by first and second curved guide surfaces, the first guide surfaces being constituted by individual guide surfaces, and the second guide surfaces being constituted by a common guide surface, each of said guide surfaces having a radius of curvature which is at least equal to the minimum bend radius for optical fibres. Advantageously, the first guide surfaces are formed in a guide block made of machined aluminium or ABS.

In a preferred embodiment, the support member is made of a vacuum-formed plastics material such as polystyrene, the support member is fixed to a chassis made of steel, and the optical connectors are fixed to the chassis.

Exchange equipment incorporating optical fibre back planes constructed in accordance with the invention will now be described, by way of example, with reference to the accompanying drawings, in which.

Figure 1:
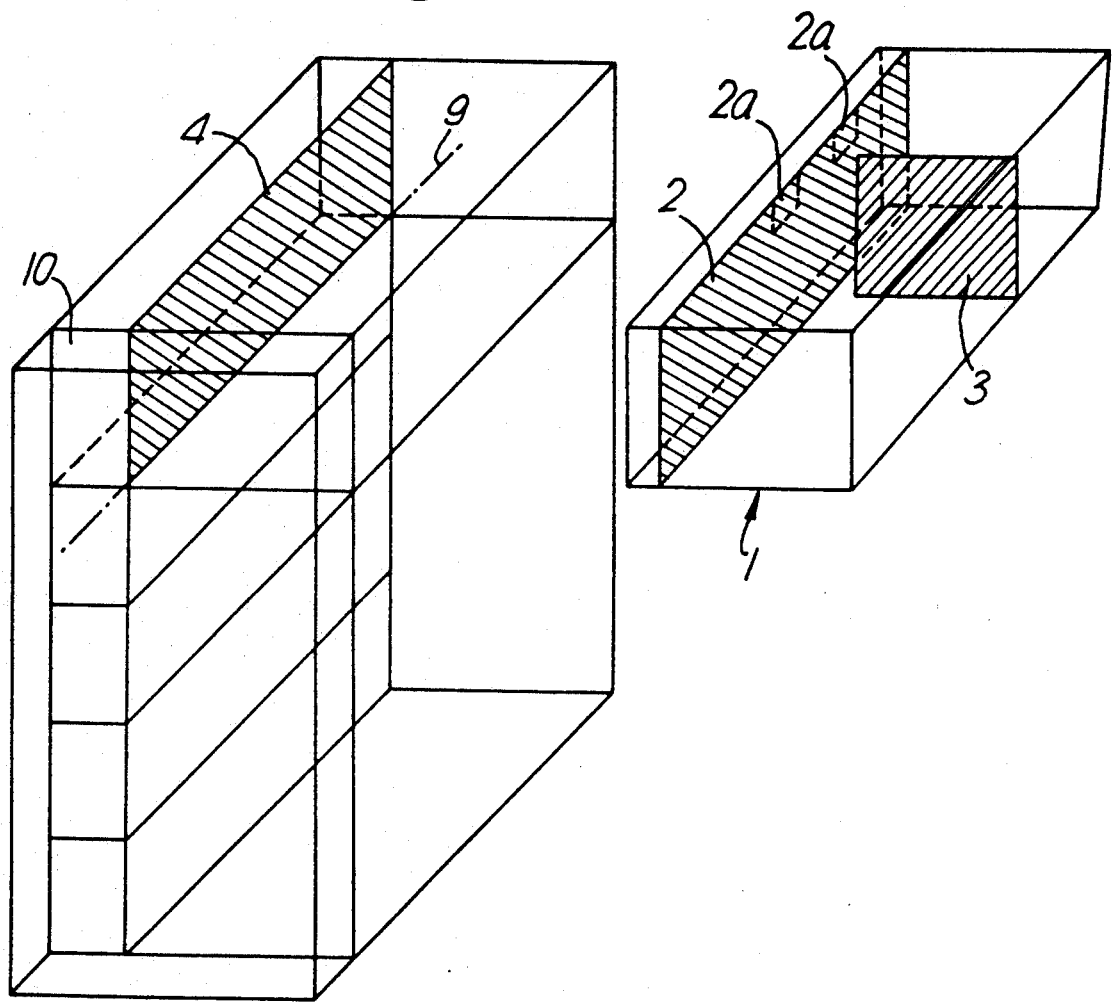
FIG. 1 is a schematic perspective view of the exchange equipment, and shows one optical fibre back plane.

Referring to the drawings, FIG. 1 is a schematic representation of exchange equipment having both transmission and switching capabilities. The exchange equipment has five shelves 1 (only one of which is shown) which are slidable into, and out of, the framework of the exchange equipment on guides (not shown). Each shelf 1 has an electronic back plane 2 and a plurality of cards 3 (only one of which is shown). Each of the cards 3 carries a plurality of electronic components for carrying out transmission and/or switching functions. The electronic back plane 2 of each shelf 1 co-operates, in a manner described below, with a respective optical fibre back plane 4 (only one of which is shown in FIG. 1).

As the optical fibre back planes 4 are identical, only one of them will be described in detail. Thus, referring to FIG. 2, the optical fibre back plane 4 is constituted by a main support member 5 made of a vacuum-formed plastics material such as polystyrene, a steel chassis (support plate) 6, and a fibre guide member 7 made of machined aluminium or ABS. The main support member 5 is fixed to the chassis 6 by means of double-sided adhesive tape or any other suitable adhesive. The chassis 6 is pivotally attached to the framework of the exchange equipment by means of a hinge 8, the pivotal axis 9 (see FIG. 1) of which is generally horizontal and positioned at the lower long edge of the optical fiber back plane 4. This pivotal mounting of the optical fibre back plane 4, permits the back plane to be pivoted down from its normal operating position (shown in FIG. 1) through 90° to facilitate access to the components associated with the back plane.

Figure 2:
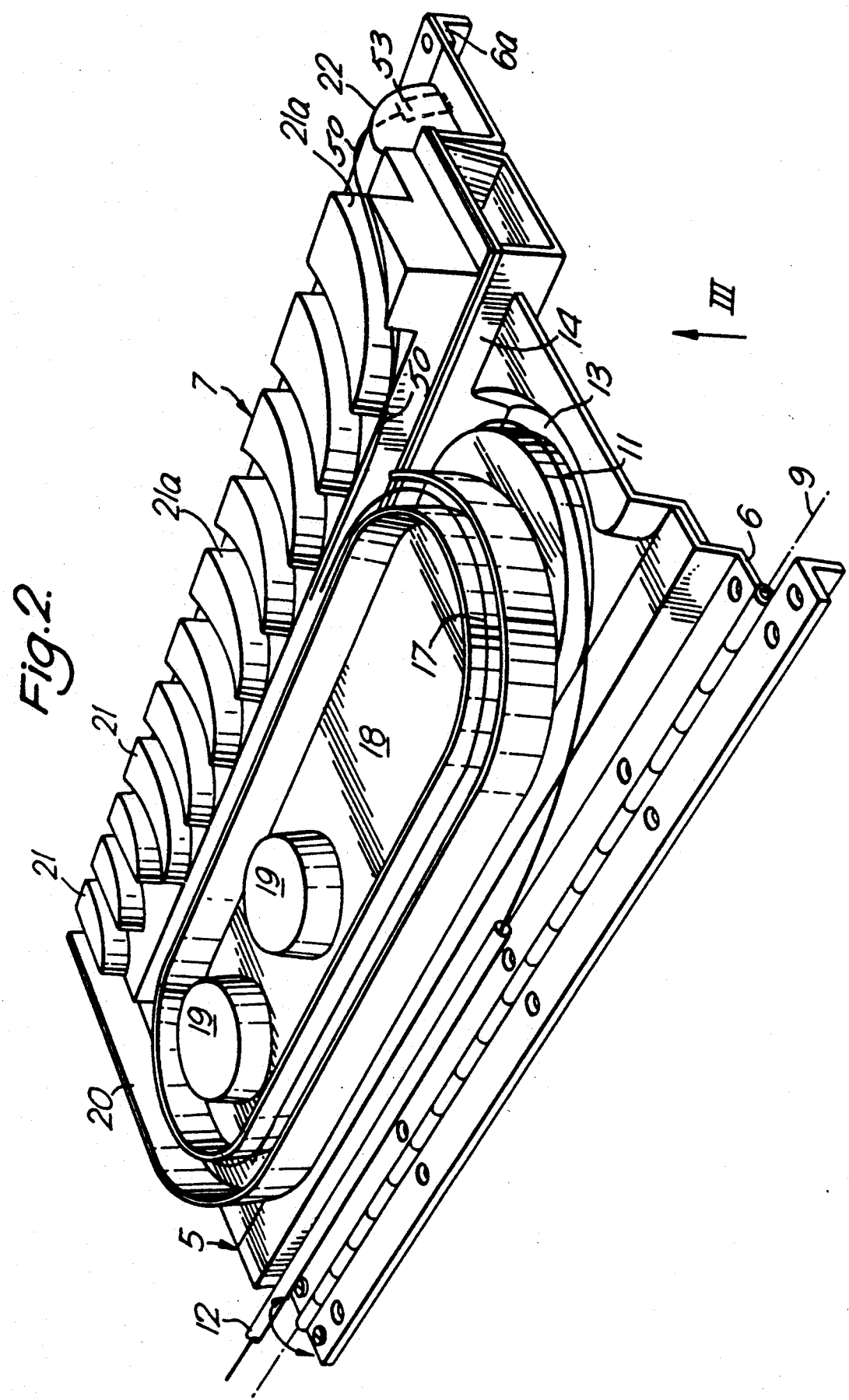
FIG. 2 is a perspective view of the optical fibre back plane of FIG. 1.

Optical fibres are fed to the optical fibre back planes 4 via a vertical cable run 10 provided at one side of the exchange equipment. Each back plane 4 is associated with a plurality of incoming optical fibres 11 (only one of which is shown in FIG. 2). These fibres 11 are guide from the cable run 10 to the back plane 4 by a tube 12 which is fixed to the back of the main support member 5. The tube 12 extends about half way along the lower edge of the back plane 4, and is parallel to (and closely spaced from) the axis 9. Thus, when the back plane 4 is pivoted between its normal operating position (vertical) and its "access" position (horizontal), the optical fibres 11 do not undergo any stress. After the fibres 11 leave the tube 12, they are guided through a curved channel 13 and a slot 14 to the front side of the back plane 4. The curved channel 13 has a radius of curvature of 35 mm, that is to say the minimum bend radius of optical fibres.

Figure 3:
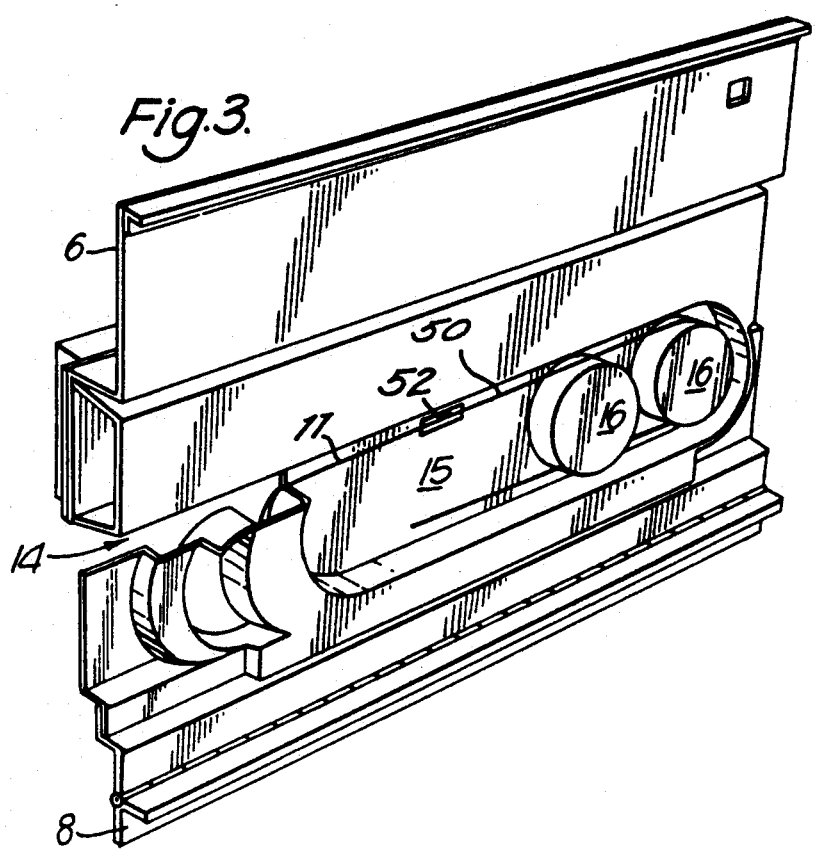
FIG. 3 is perspective view of the optical fibre back plane of FIG. 1 looking in the direction of the arrow III of FIG. 2.
Figure 4:
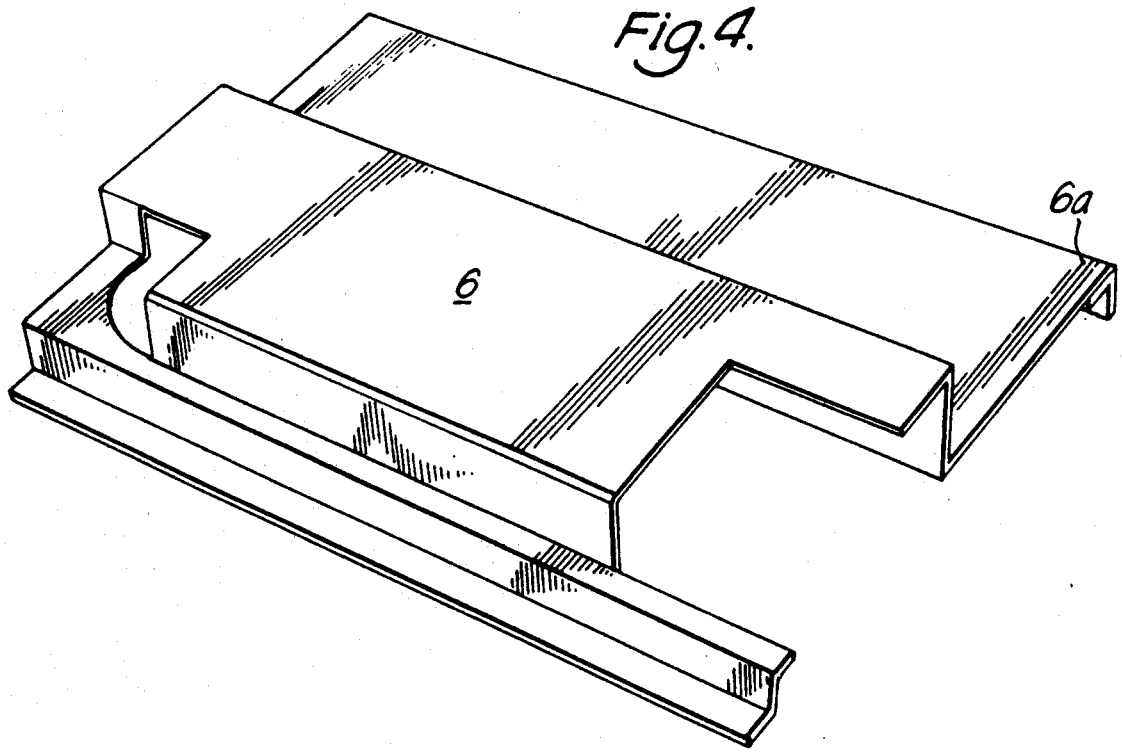
FIG. 4 is a perspective view of the support plate of the optical fibre back plane.

The front side of the back plane 4 (see FIG. 3) includes a fibre storage area 15 and a pair of generally cylindrical bosses 16. The bosses 16 each have a radius of curvature of 35 mm. The area 15 is used for spare fibre storage of incoming optical fibres (that is to say the optical fibres 11). The area 15 also constitutes an optical interface for interconnecting incoming fibres 11 with on-board optical fibres 50.

The optical interface 52 may be constituted by any known means for interconnecting optical fibres (for example single fibre or mass fusion splices, single or multiple fibre connectors, or single or multiple fibre mechanical splices). The bosses 16, being of minimum bend radius, are used to guide the optical fibres to and from the optical interface, as well as to guide the incoming fibres 11 from the slot 14, and to guide outgoing on-board fibres back through the slot. These outgoing fibres pass through the slot 14 and round a curved channel 17 (see FIG. 2) formed in the back of the support number 5. This channel 17 also has a radius of curvature of 35 mm.

The outgoing fibres then pass into a fibre storage area 18, which is used for spare fibre storage of on-board optical fibres. The fibre storage area 18 includes a pair of generally cylindrical bosses 19 which are used to guide the on-board optical fibres around this storage area. Once again, the bosses have a radius of curvature of 35 mm. The fibre storage area 18 may also house optical components and devices (not shown), such as couplers, switches, WDM devices or filters.

The on-board optical fibres 50 exit the storage area 18 via a curved channel 20 having a radius curvature of 35 mm. The curved channel 20 leads to the fibre guide member 7 which is formed with eleven fibre guides 21, each of which has a curved guide surface 21a. The curved guide surfaces 21a each have a radius of curvature of 35 mm. Each guide surface 21a leads to a respective connector 53 fixed to a top edge portion 6a of the chassis 6. The optical fibres exiting the guide surfaces 21a are guided to the associated connectors by a curved guide member 22 whose radius of curvature is 35 mm. Each of the connectors projects from the portion 6a of the chassis 6 for connection to a complementary connector (not shown) associated with a respective card 3 of the corresponding shelf 1. Cut-outs 2a are formed in the associated electrical back plane 2 to permit the complementary connectors to make contact.

It will be apparent that this type of optical fibre back plane 4 will normally reside behind its electronic component shelf 1 in a sterile environment, that is to say the fibre and components it houses are inaccessible when the back plane is in its normal (vertical) operating position. This permits the use of secondary or primary coated fibres throughout the equipment housing. In particular, there is no need for the incoming optical fibres to be ruggedised, so there is a substantial cost saving over prior-art optically-cabled exchange equipment.

Another advantage of the optical fibre back plane 4 is that its three-dimensional moulding allows minimum bend radius of fibre (35 mm approximately) to be maintained from the fibre entry region to the exit connectors, via the storage areas 15 and 18 and all intermediate regions. Moreover, by pivotally mounting the optical fibre back plane 4 on its hinge 8, access for maintenance and installation purposes is facilitated. Furthermore, because the incoming fibres enter the back plane 4 substantially along the hinge axis 9, this pivoting can occur without the fibres being terminated on the back plane undergoing any stress as a result of the pivoting movement of the back plane.

The optical fibre back plane 4 can be manufactured on the bench, or in the factory, to any given specification. No field installation work is required, except for connection to the incoming optical fibres via the optical interface. Installation of optical fibre inputs to exchange equipment is, therefore, simplified. Moreover, the optical fibre back plane can be a standard item which can be used in many different types of exchange equipment; the back plane being adaptable to different situations by the incorporation of different optical components and devices, and by using different numbers of exit connectors.

It will be apparent that the optical fibre back plane described above would be modified in a number of ways. For example, the entire back plane (including the fibre guide member 7 and the chassis 6) could be moulded in one piece from a suitable plastics material. Also, the optical interface between the incoming fibres and the on-board fibres could be positioned in any convenient site on either side of the back plane. Similarly, the optical interface between the on-board fibres and the cards need not be in the form of complementary optical connectors, but would take the form of pigtails, in which case ruggedised optical fibres would be used. In a further modification, the optical components (such as couplers, switches, WDM devices or filters) could be stored in a dedicated storage area instead of in the storage area 18. In this case, the back plane moulding would be appropriately modified to form this dedicated storage area.

In particularly advantageous modified embodiment, the optical fibre back plane could be enhanced by the inclusion of a free space optical waveguide mounted in such a manner as to allow clock and/or data distribution between the cards 3. In this case optical signals could be transmitted from the waveguide to a receiver on an associated card 3 via a perspex rod fixed to the card. One end of the perspex rod would be aligned with the receiver, the other end passing through a cut-out in the optical fibre back plane and being in alignment with the waveguide. In practice, the waveguide runs at right-angles to the receiver, so that the perspex rod must deflect the light it carries through 90°. This can be done by cutting the waveguide and surface of the rod at 45° and polishing this cut surface to form a transparent surface. The rod then acts as a 'periscope' to reflect incoming light through 90°.

We claim:

1. An optical fibre back plane for feeding incoming optical fibres to exchange equipment having a plurality of shelves with a back plane being disposed transversely thereto and with a plurality of cards carrying transmission, distribution and/or switching components thereof, each said card being transverse to its shelf and back plane, the optical fibre back plane comprising:
a support member,
attachment means for attaching the support member to the exchange equipment for pivotal movement about an axis, and
optical interface means for connecting the incoming optical fibres to on-board optical fibres, each said on-board optical fibre being a length of optical fibre between fibre ends carried on-board said back plane for coupling an incoming optical fibre to components of the exchange equipment carried on one of said cards,
wherein the optical fibre back plane is provided with support means for supporting the incoming optical fibres, the support means extending parallel, and closely adjacent, to said axis.

2. A back plane as in claim 1, wherein the back plane is provided with second optical interface means for connecting on-board optical fibres to optical fibres leading to the exchange equipment.

3. A back plane as in claim 1, wherein the support member is formed with a first fibre storage area for storing spare incoming optical fibres.

4. A back plane as in claim 3 wherein the support member is formed with a second fibre storage area for storing spare on-board optical fibres.

5. A back plane as in claim 3 wherein the fibre storage area is provided with at least one generally cylindrical boss whose radius of curvature is at least equal to the minimum bend radius for the incoming and on-board optical fibres.

6. An optical fibre back plane for feeding incoming optical fibres to exchange equipment, the optical fibre back plane comprising:
a support member,
attachment means for attaching the support member to the exchange equipment for pivotal movement about an axis, and
optical interface means for connecting the incoming optical fibres to on-board optical fibres,
wherein the optical fibre back plane is provided with support means for supporting the incoming optical fibres, the support means extending parallel, and closely adjacent, to said axis,
wherein the support member is formed with a first fibre storage area for storing spare incoming optical fibres,
wherein the support member is formed with a second fibre storage area for storing spare on-board optical fibres, and
wherein fibre storage areas are positioned on opposite sides of the support member.

7. An optical fibre back plane for feeding incoming optical fibres to exchange equipment, the optical fibre back plane comprising:
a support member,
attachment means for attaching the support member to the exchange equipment for pivotal movement about an axis, and
optical interface means for connecting the incoming optical fibres to on-board optical fibres,
wherein the optical fibre back plane is provided with support means for supporting the incoming optical fibres, the support means extending parallel, and closely adjacent, to said axis, and
wherein the support means is constituted by a tube extending part way along the support member adjacent to one edge thereof, said one edge being associated with a hinge which constitutes the attachment means.

8. A back plane as in claim 7, wherein incoming optical fibres exit the tube and are guided towards a first fibre storage area by a curved channel whose radius of curvature is at least equal to the minimum bend radius for the incoming and on-board optical fibres.

9. A back plane as in claim 8, wherein the first fibre storage area is positioned on the opposite side of the support member to the tube, the incoming optical fibres passing from the curved channel to the first fibre storage area via a slot formed in the support member.

10. A back plane as in claim 9, wherein the on-board optical fibres pass from the first fibre storage are to a second fibre storage area via said slot and via a second curved channel formed adjacent to the second fibre storage area, the radius of curvature of the second curved channel being at least equal to the minimum bend radius for the incoming and on-board optical fibres.

11. An optical fibre back plane for feeding incoming optical fibres to exchange equipment, the optical fibre back plane comprising:
a support member,
attachment means for attaching the support member to the exchange equipment for pivotal movement about an axis, and
optical interface means for connecting the incoming optical fibres to on-board optical fibres,
wherein the optical fibre back plane is provided with support means for supporting the incoming optical fibres, the support means extending parallel, and closely adjacent, to said axis, and
wherein the optical interface means is positioned within the first fibre storage area.

12. An optical fibre back plane for feeding incoming optical fibres to exchange equipment, the optical fibre back plane comprising:
a support member,
attachment means for attaching the support member to the exchange equipment for pivotal movement about an axis, and optical interface means for connecting the incoming optical fibres to on-board optical fibres, wherein the optical fibre back plane is provided with support means for supporting the incoming optical fibres, the support means extending parallel, and closely adjacent, to said axis, wherein the support member is formed with a first fibre storage area for storing spare incoming optical fibres, and wherein the support member is provided with optical components including at least one of couplers, switches, WDM devices or filters.

13. A back plane as in claim 12, wherein the optical components are positioned within a fibre storage area.

14. An optical fibre back plane for feeding incoming optical fibres to exchange equipment, the optical fibre back plane comprising:

a support member, attachment means for attaching the support member to the exchange equipment for pivotal movement about an axis, and optical interface means for connecting the incoming optical fibres to on-board optical fibres, wherein the optical fibre back plane is provided with support means for supporting the incoming optical fibres, the support means extending parallel, and closely adjacent, to said axis, wherein the back plane is provided with second optical interface means for connecting on-board optical fibres to optical fibres leading to the exchange equipment, and wherein each of the on-board optical fibres is guided towards a respective optical connector by a respective guide means, the optical connectors constituting the second optical interface means.

15. A back plane as in claim 14, wherein each of said guide means is constituted by first and second curved guide surfaces, the first guide surfaces being constituted by individual guide surfaces, and the second guide surfaces being constituted by a common guide surface, each of said guide surfaces having a radius of curvature which is at least equal to the minimum bend radius for the incoming and on-board optical fibres.

16. A back plane as in claim 15, wherein the first guide surfaces are formed in a guide block made of machined aluminum or ABS.

17. A back plane as in claim 14 wherein the support member is fixed to a chassis made of steel.

18. A back plane as in claim 17 wherein optical connectors are fixed to the chassis.

19. An optical fibre back plane for feeding incoming optical fibres to exchange equipment, the optical fibre back plane comprising:

a support member, attachment means for attaching the support member to the exchange equipment for pivotal movement about an axis, and optical interface means for connecting the incoming optical fibres to on-board optical fibres, wherein the optical fibre back plane is provided with support means for supporting the incoming optical fibres, the support means extending parallel, and closely adjacent, to said axis, and wherein the support member is made of a vacuum-formed plastics material such as polystyrene.

* * * * *